R. E. HALL.
DENTAL ARTICULATOR.
APPLICATION FILED JUNE 4, 1918.

1,338,918. Patented May 4, 1920.

Witness
William J. Russell

Inventor
Rupert E. Hall,
By Clifton C. Callowell
Attorney

UNITED STATES PATENT OFFICE.

RUPERT E. HALL, OF CHICAGO, ILLINOIS.

DENTAL ARTICULATOR.

1,338,918.   Specification of Letters Patent.   Patented May 4, 1920.

Original application filed March 30, 1917, Serial No. 158,518. Patent No. 1,271,161, dated July 2, 1918. Divided and this application filed June 4, 1918. Serial No. 238,091.

*To all whom it may concern:*

Be it known that I, RUPERT E. HALL, a citizen of the United States, residing at Chicago, in the county of Cook, State of Illinois, formerly of Philadelphia, county of Philadelphia, State of Pennsylvania, have invented certain new and useful Improvements in Dental Articulators, of which the following is a specification, reference being had to the accompanying drawings.

This application is a divison of my prior application, Serial No. 158,518, filed March 30, 1917.

My invention relates particularly to that class of devices which are commonly known as articulators, and which are adapted to support sets of artificial teeth in such relation that they may be relatively moved so as to simulate the natural masticatory movements of the teeth carried by the human jaw.

The principal objects of my invention are, to provide a dental articulator comprising mechanism that will not only reproduce with precision the natural relative masticatory movements of the human jaw, but which may be so adjusted as to accurately coincide with the measurements and conditions that may be found in each individual patient.

Other objects of my invention are, to provide means for relatively shifting the jaw model holders longitudinally to produce any desired degree of overbite; to provide means whereby the jaw models may be hingedly moved toward and from each other on an adjustable axis, and to provide means for guiding said movements in predetermined angles with respect to the occlusal plane.

My invention further comprehends means arranged to establish the correct triangular or anatomical relation of the casts or jaw models to the external occipital protuberance and the glenoid fossæ.

Specifically stated the form of my invention as hereinafter described, comprises upper and lower jaw model holders hingedly connected, and arranged to be relatively moved about an axis oblique to the occlusal plane, and includes means whereby said oblique axis may be variably disposed at different angles with respect to said occlusal plane.

My invention also includes all of the various novel features of construction and arrangement as hereinafter more definitely described.

Figure 1:
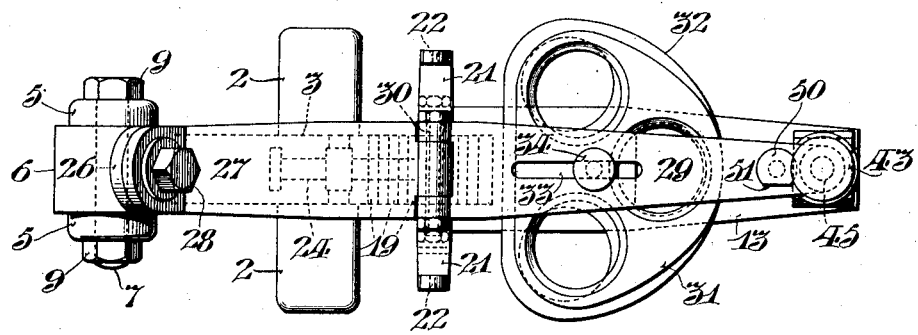
Figure 2:
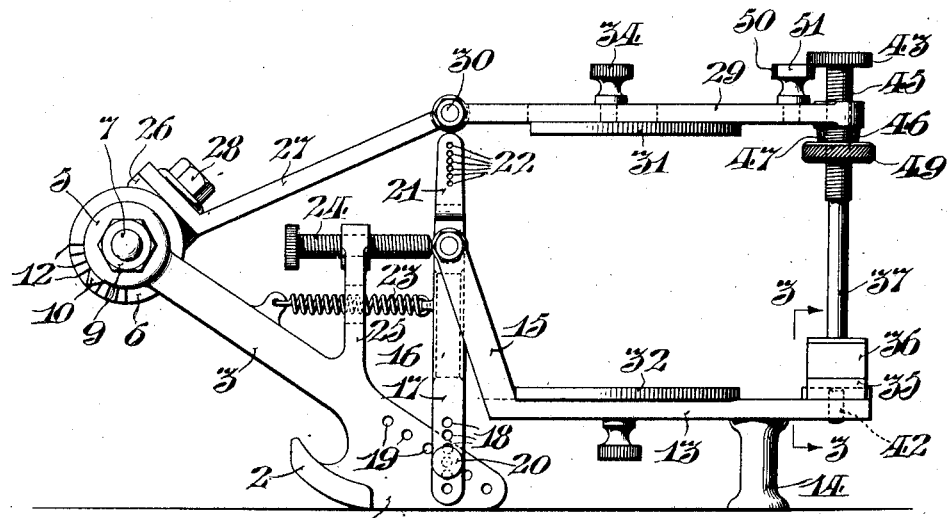
Figure 3:
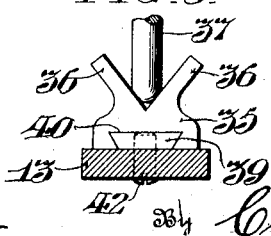

Figure 1 is a plan view of an articulator constructed in accordance with my invention; Fig. 2 is a side elevation of said articulator; and Fig. 3 is a sectional view of said articulator taken on the line 3—3 in Fig. 2.

In said figures, the base 1 has the longitudinally extended heel 2 and the rearwardly inclined support 3 terminating in a bearing head comprising the spaced bearing lugs 5 between which the hub 6 of the upper jaw model holder support is rotatably adjustable upon the shaft 7 and securely engaged in set position by the nuts 9; the position being determined by the pointer 10 on the bearing lugs 5 and the graduations 12 on the hub 6 as shown in Fig. 2. By this means the angle of the axis of the pivotal bearing, to be hereinafter described, may be varied.

The lower jaw model holder 13 has the supporting leg 14, and the upwardly and rearwardly inclined arms 15 whose free ends are pivotally connected with the upright connecting link 16 which is bifurcated at its opposite ends, the lower bifurcations 17 having a series of apertures 18 disposed longitudinally thereof and arranged to respectively register with a series of similar apertures 19 in the base but disposed in inclined relation so that said link 16 may be adjusted either forward or backward and engaged with the base by the retaining pin or bolt 20.

This adjustment is for the purpose of varying the size of the articulator to accommodate dentures of varying size, and in order to preserve the triangular relation that is known to be present in the human skull between the glenoid fossæ, the occipital protuberance and the central incisal point, the upwardly extending bifurcations 21 of the link 16, are provided with suitably graduated apertures 22, for connection with a suitable measuring or model setting device such as the device commonly known as a face-bow, the condyle points thereof being inserted in the aperture 22 which corresponds with the registered apertures 18 and 19 in the bifurcations 17, and base 1.

The connecting link 16 is connected with the support 3 by the spring 23 which tends to draw said bar 16 against the adjusting screw 24 which is in threaded engagement with the standard 25. By this arrangement, it will be noted that the lower jaw model may be extended and retracted in opposition to the spring 23 relative to the upper jaw model, either manually or by the adjusting screw 24.

The hub 6 of the upper jaw model holder support is provided with a bearing boss 26, providing a bearing whose axis is inclined to the occlusal plane and capable of adjustment as above described to vary the angle of inclination.

Said bearing boss 26 oscillatably carries the upper jaw model holder support 27 which is rotatably attached thereto by the tap bolt 28 in threaded engagement with the bearing boss 26.

The upper jaw model holder support 27 hingedly carries the upper jaw model holder 29 which is hingedly connected therewith by the hinge bolt 30, and which carries the upper jaw model mounting 31 in opposition to the lower jaw model mounting 32 on the lower jaw model holder.

Although the hinge bolt 30 affords means for opening the jaw models for inspection, it is to be understood that in the operation of the device, said hinge bolt 30 may be so tightened as to maintain the support 27 and the upper jaw model holder 29 relatively rigid, so that the relative vertical movement of the jaw models will be about the pivotal axis 28. This as will be readily observed will necessarily cause a rocking action of the base 1, which is curved rearwardly upward to afford a heel upon which it may rock.

In view of the fact that the lower jaw model holder 13 is longitudinally adjustable, and that it is essential that the jaw model mountings should be in registry, the upper jaw model holder 29 is provided with a longitudinally extending slot 33, through which the set-screw 34 extends and may travel to longitudinally adjust the upper jaw model mounting 31 to proper alinement with the opposed lower jaw model mounting 32 when longitudinally adjusted as above described.

It will be seen that the opposed jaw models that may be carried by the respective jaw model holders 13 and 29 may be relatively moved laterally about the tap-bolt 28, and that they may be separated or caused to approach by swinging upon the axis of the shaft 7. This affords a compound relative movement of the jaw models.

In order that this compound movement shall be in uniform path a guide 35 is provided which is removably mounted upon the lower jaw model holder 13 and comprises the longitudinally extended V-shaped trough formed by upwardly diverging wings 36 respectively disposed at a predetermined angle to the medial longitudinal plane of the articulator.

The walls of the trough formed by the wings 36 serve to guide the free end of the depending pin 37 which is adjustably mounted in and normally supports the upper jaw model holder 29 with its free end resting in the bottom of the trough as best shown in Fig. 3 of the drawings, it being noted that any movement laterally of the jaw model holder 29 necessitates the cooperation of the pin 37 with said walls. This it will be seen effects a natural chewing action and insures the grinding of the teeth cusps to the angle best adapted for mastication.

The guide 35 is removably engaged with the lower jaw model holder 13 by a dovetail connection comprising a longitudinally extended laterally undercut rib 39 fitting into a corresponding slot 40 in the bottom of said guide. The guide 35 is arranged to be engaged with the lower jaw model holder 13 by sliding it inwardly from the front of the articulator and may be secured thereto by the set screw 42, shown in dotted lines in Figs. 2 and 3.

As shown in Figs. 1 and 2, the pin 37 has a knurled head 43 adjoining its threaded upper portion 45, and extends in threaded engagement through the boss 46 on the outer extremity of the upper jaw model holder 29. Said boss 46 is provided with saw-cuts 47 which render it yielding, and its outer tapered surface is threaded to receive the knurled nut 49, which when rotated thereon to drive it in the direction of increasing diameter, tends to bind said boss upon the pin 37 and thereby securely hold it against accidental displacement.

It may be desirable under certain conditions to either retract or advance the pin 37, but it is highly advantageous that its normal position be readily determined, and for this purpose a stop is provided in the form of a thumb screw 50 whose knurled head normally extends into the path of the head 43 of the pin 37 to form a stop therefor as best shown in Fig. 2, the head of the thumb screw 50 being provided with a flat side 51, which when presented in the direction of the pin 37 permits the head 43 of said pin 37 to freely pass.

It may be here noted that there has been found some variation in the human skull, so that in some instances it may be desirable to vary the angle of inclination of the axis about which the upper jaw model holder oscillates laterally. This may be conveniently accomplished by advancing or retracting the pin 37 or substituting therefor a longer or shorter pin so that, as may be readily seen, said axis may be rocked to a different inclination, about the axis of the hinge-shaft 7.

I do not desire to limit my invention to the precise details of construction and arrangement as herein set forth, as it is obvious that various modifications may be made therein without departing from the essential features of my invention as defined in the appended claims.

Having thus described my invention, I claim:—

1. An articulator comprising a base having a curved heel upon which it may rock, and upper and lower jaw model holders pivotally connected and arranged for relative oscillation upon an axis inclined with respect to the occlusal plane, whereby the lateral oscillation of the upper jaw model holder effects the rocking of said base upon its heel.

2. An articulator comprising a base, having a rearwardly curved heel upon which it may rock, upper and lower jaw model holders pivotally connected for relative oscillation upon an axis inclined with respect to the plane of occlusion, a link pivotally connecting said lower jaw model holder with said base, and a guide for said upper jaw model holder operative to effect a rocking action of said base upon its heel when said upper jaw model holder is laterally oscillated.

3. An articulator comprising a base, upper and lower jaw model holders pivotally connected for relative oscillation upon an axis inclined with respect to the occlusal plane, and means including a link adjustable to vary the longitudinal position of said lower jaw model holder.

4. An articulator comprising a base, upper and lower jaw model holders, and a link pivotally connecting said lower jaw model holder with said base, and adjustable longitudinally of said articulator.

5. An articulator comprising a base having a series of apertures spaced in an inclined plane, upper and lower jaw model holders, and a link pivotally connecting said lower jaw model holder with said base and having a series of apertures arranged to respectively register with the apertures in said base, and means for adjustably connecting said link with said base in different positions through said registered apertures.

6. An articulator comprising a base having a series of apertures spaced in an inclined plane, upper and lower jaw model holders, and a link pivotally connecting said lower jaw model holder with said base and having a series of apertures arranged to respectively register with the apertures in said base, and having a series of apertures for the engagement of a face-bow, and means for adjustably connecting said link with said base in different positions through said registered apertures.

7. An articulator comprising a base having a series of apertures spaced in an inclined plane, upper and lower jaw model holders, a link having a series of apertures arranged to register with the apertures in said base, means securing said link and base together with selected apertures in registry, a pivotal connection between said lower jaw model holder and said link, means yieldingly tending to draw said link and holder backward, and means arranged to adjust said link and holder in opposition to said yielding means.

8. An articulator comprising a base having a series of apertures spaced in an inclined plane, upper and lower jaw model holders, a link having a series of apertures arranged to register with the apertures in said base, means securing said link and base together with selected apertures in registry, a pivotal connection between said lower jaw model holder and said link, an adjusting screw arranged to advance and retract said link and lower jaw model holder, and a spring tending to hold said link against said screw.

9. An articulator comprising a base arranged to rock, a lower jaw model holder hingedly connected with said base on a horizontal axis, and an upper jaw model holder pivotally connected with said base on an axis oblique to the occlusal plane, and arranged to rock said base relative to said lower jaw model holder, when oscillated on said oblique axis.

10. An articulator comprising a base arranged to rock, a lower jaw model holder hingedly connected with said base on an adjustable horizontal axis, an upper jaw model holder pivotally connected with said base on an axis oblique to the occlusal plane, a guide for said upper jaw model holder adjustable longitudinally and arranged to effect a rocking motion of said base when said upper jaw model holder is laterally oscillated.

In witness whereof, I have hereunto set my hand this 27th day of May, A. D., 1918.

RUPERT E. HALL.

Witnesses:
MARY VAN LENNEP,
MICHAEL STEINDLER.